Sept. 1, 1936.　　　C. P. STUART　　　2,052,853
CLAMPING DEVICE
Filed May 13, 1935　　　2 Sheets-Sheet 1
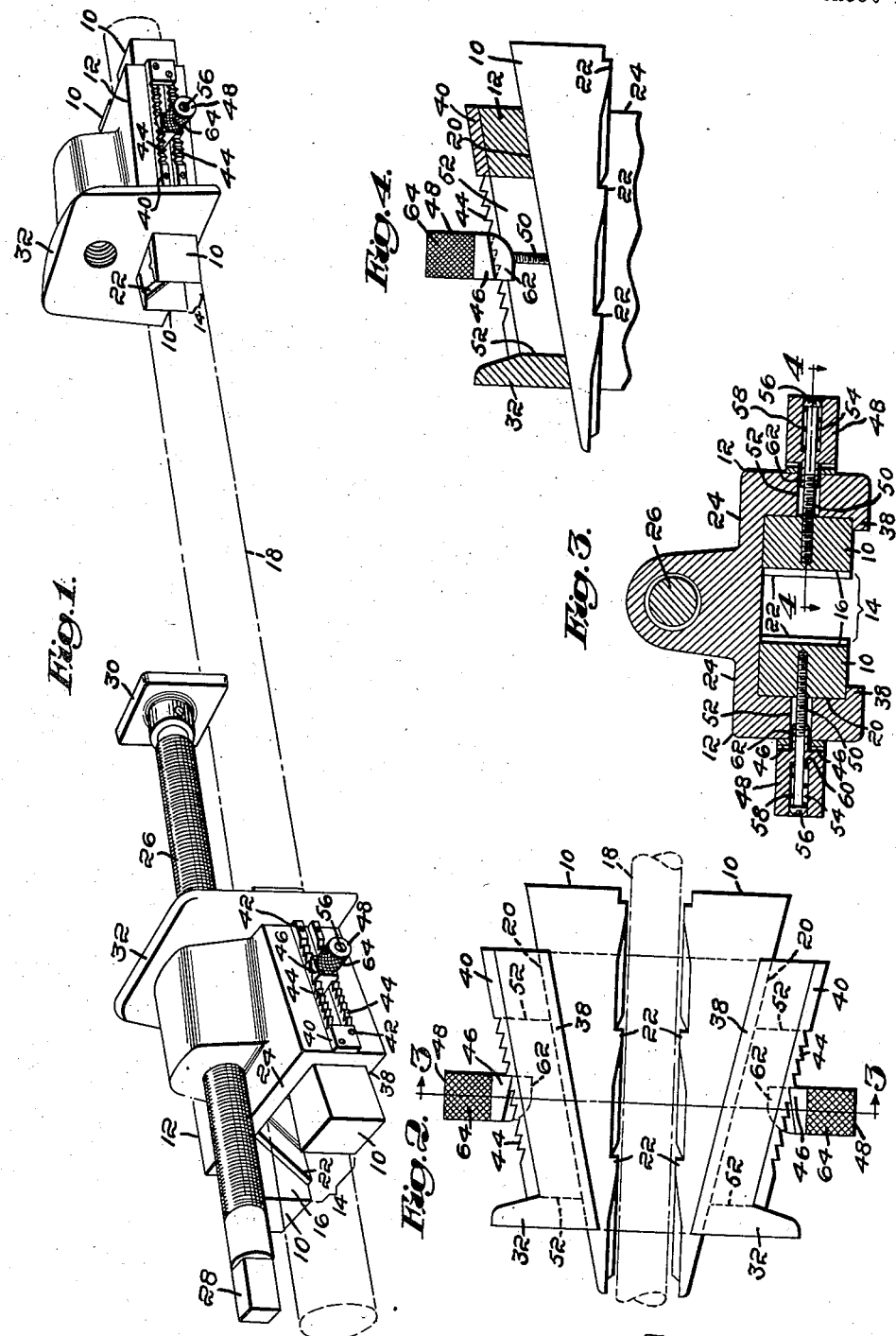

Sept. 1, 1936.  C. P. STUART  2,052,853
CLAMPING DEVICE
Filed May 13, 1935  2 Sheets-Sheet 2
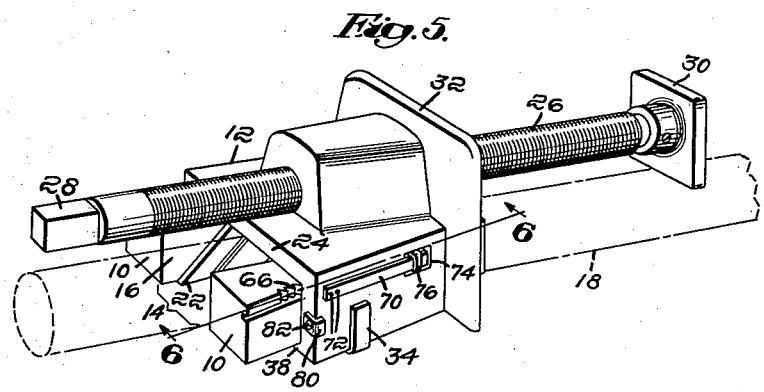
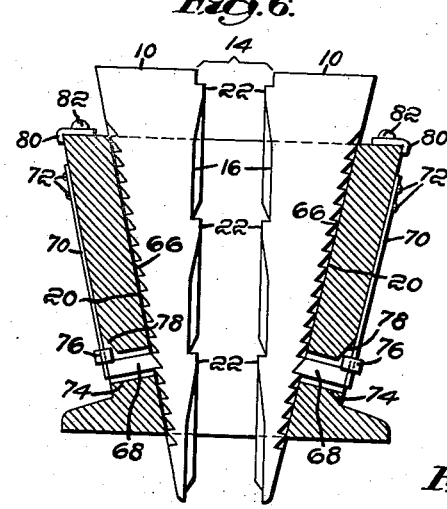
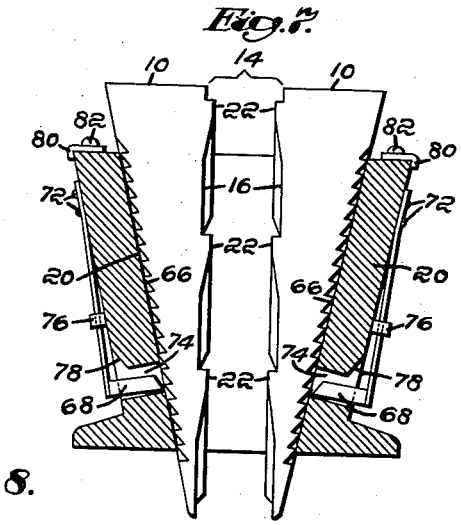
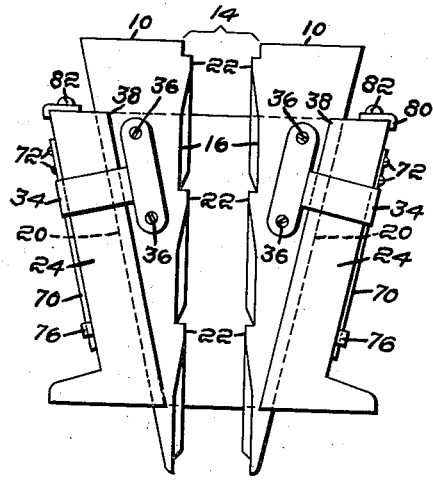
Inventor:
Carl Philip Stuart,
by Emery, Booth, Varney & Townsend
Attys Patented Sept. 1, 1936

2,052,853

UNITED STATES PATENT OFFICE 2,052,853

CLAMPING DEVICE

Carl Philip Stuart, Gorham, N. H.

Application May 13, 1935, Serial No. 21,081

5 Claims. (Cl. 144—303)

This invention is in the nature of a further development of and an improvement upon the clamping device which is the subject matter of United States Letters Patent No. 1,998,597, issued April 23, 1935, to me.

In the present invention, as in the aforesaid patent, the clamping device comprises a pair of wedge-like jaws and a body which I term a saddle provided with guides for the jaws, the relative arrangement being such that, if an elongated member is placed between the jaws and the saddle then moved relatively to the jaws in one direction, the jaws are caused to approach each other and to grip the member therebetween. On the other hand, if the saddle is moved in the opposite direction, the jaws recede from each other and their grip on the interposed member is relaxed or released.

In the present invention, as in the aforesaid patent, the movement of the saddle relatively to the clamping jaws is produced by an actuating screw carried by and having screw threaded connection with the saddle, and extending lengthwise of the channel between the two opposed faces of the jaws. This screw is provided at one end with an abutment having swiveled connection with the screw for engagement with an object against which a thrust is to be developed to react upon the saddle and to move the latter rearwardly with relation to the object. This movement causes the inclined guides of the saddle to travel along the wedge-like jaws and to move the latter toward each other to grip the member interposed therebetween. The member between the jaws may be any convenient elongated member such as a board, a pipe, or any other handy elongated member.

In the present invention, as in the aforesaid patent, one such clamping unit may be used alone for exerting pressure against an object and may even be used as a lifting jack. Two such units, placed upon an appropriate elongated member or beam, one unit with an actuating screw and the other either with or without an actuating screw, may be employed as a cabinet maker's or carpenter's clamp, in which event the object to be clamped is placed between the two units, and the abutment on the end of the actuating screw is placed against one side of the object, while preferably the saddle of the other unit is placed directly against the opposite side of the object.

The present invention is concerned with automatic means to prevent backward movement of the saddle with relation to the wedge-like clamping jaws when the thrust of the actuating screw is removed. Thus the adjustment, i. e., the relative spacing of the jaws, is preserved and the clamping unit can, without preliminary readjustment, be applied to successive objects of the same dimension between the clamping abutments and to the same elongated member which constitutes the connecting beam. The present invention contemplates for this purpose the use of a ratchet and pawl for each of the jaws. According to one form of the invention, the ratchets are on the saddle and the pawls are carried by the wedge-like jaws. According to another form, the ratchets are carried by the wedge-like jaws and the pawls are carried by the saddle. In both forms the pawls can be rendered ineffective, thereby to enable the saddle and the jaws to be moved freely with relation to each other for adjustment to the elongated member and to the object to be placed between the clamping units.

The invention will best be understood by reference to the following description when taken in connection with the accompanying drawings of two specific embodiments thereof, while its scope will be pointed out more particularly in the appended claims.

In the drawings:

Fig. 1 is a perspective view of two clamping units embodying one form of the invention, one of them being provided with an actuating screw, the units being relatively arranged for application to an appropriate beam, shown in broken lines, by which the units are to be connected when it is desired to clamp an object between the abutment on the screw carried by one unit and the abutment on the other unit;

Fig. 2 is a bottom plan of one of the units shown in Fig. 1, showing the pawls operatively engaged with the ratchets;

Fig. 3 is a sectional view on line 3—3 of Fig. 2;

Fig. 4 is a sectional view on line 4—4 of Fig. 3, but showing the pawl after it has been reversed to render it ineffective;

Fig. 5 is a perspective view of another form of the invention, in which the ratchets are on the jaws and the pawls are carried by the saddle;

Fig. 6 is a sectional view in a plane represented by the line 6—6 of Fig. 5, showing the pawls operatively engaged with the ratchets;

Fig. 7 is a sectional view similar to Fig. 6, but showing the pawls disengaged from the ratchets; and Fig. 8 is a bottom plan of the clamping unit shown in Figs. 5, 6 and 7.

Referring to the drawings and to the embodiments of the invention illustrated by way of example, in each form, as in the aforesaid patent, each clamping unit comprises a pair of wedge-like jaws 10, connected by a body or saddle 12, and presenting a channel 14 having two opposed clamping faces 16 and an open side into which an appropriate elongated member 18 may be introduced by movement in a direction transverse to said channel. The body or saddle is movable longitudinally of the channel with relation to the jaws, and the saddle and the jaws are cooperatively formed to cause the jaws to be urged inwardly to narrow the channel and to grip the interposed member when the saddle is moved longitudinally in one direction and to relax their grip when the saddle is moved in the opposite direction, this being accomplished by providing the saddle with guides 20 which are inclined with relation to the channel 14.

In the present invention, as in the aforesaid patent, the opposed clamping faces of the jaws are preferably provided with several widely spaced teeth 22 inclined upwardly and forwardly (see Fig. 1), tending to move the interposed elongated member 18 upwardly or inwardly into the channel 14 toward a yoke or bridge 24 connecting the inclined guides 20, thus insuring a proper initial grip of the jaws on the interposed member and preventing the unit from tilting upwardly about its rear end.

In the present invention, as in the aforesaid patent, at least one of the units is provided with appropriate actuating means, such as a screw 26, having screw threaded engagement with the saddle and extending lengthwise of the channel 14, to exert a thrust against an object and thereby to move the saddle rearwardly with relation to the object and to cause the inclined guides 20 of the saddle to move the jaws 10 toward each other and to grip the interposed member 18. To facilitate rotation of the screw the latter is suitably shaped at its rear end 28 as by being squared to enable a wrench to be applied thereto, while the front end of the screw is preferably equipped with an abutment 30 having swiveled connection with the screw. In the present invention, as in the aforesaid patent, the saddle is provided with an abutment 32, and in the case of the clamping unit, which is not provided with an actuating screw, i. e., the unit which is shown at the right in Fig. 1, the inner face of this abutment may be placed against one side of an object to be clamped, while the abutment 30 carried by the actuating screw 26 is placed against the opposite side of the object. This of course is the arrangement which is employed in carpentry and cabinet work to draw together and to hold framing and other members for mortising, tongue and groove work, gluing, and other operations. As already indicated, one of the units, i. e., the one equipped with the actuating screw, may be used alone for various clamping operations and as an elevating jack.

In the form shown in Figs. 5 to 8 inclusive, as in the aforesaid patent, the jaws are prevented from dropping out of the saddle as by providing the jaws with L-shaped bent arms 34 suitably secured to the jaws as by screws 36 (see Fig. 8) and extending first beneath the guides 24 of the saddle and thence upwardly (see Fig. 5) on the outer faces of the guides. In both forms, as in the aforesaid patent, the guides 20 are provided with inwardly directed flanges 38 which overlie the jaws 10 and assist in retaining the latter in place in the saddle. In the form of the invention shown in Figs. 1 to 4 inclusive, the arms 34 are omitted as they are not needed, because, as will presently appear, the mountings for the pawls prevent the jaws from dropping out of the saddle.

In the form illustrated in Figs. 1 to 4 inclusive there are ratchets carried by the saddle, and pawls carried by the jaws. In the present example, instead of forming the ratchets as integral parts of the saddle, as might perhaps be done, there are secured to the outer faces of the guides 20 ratchet plates 40 appropriately fastened in place as by screws or rivets 42, and each of these plates is provided with one or more, herein two, sets of ratchet teeth 44, which are preferably rather small, and where the teeth are formed on a separate plate, as in the present example, this plate may have the teeth formed by cutting them into the plate, which may, for example, be made of steel.

The ratchet teeth 44 cooperate with an appropriate pawl or perhaps more properly a pair of pawls 46 suitably formed on a pawl carrier, herein a sleeve 48, which is carried by the associated clamping jaw as by being disposed about a suitable pintle, herein a screw 50 (see Fig. 3) threaded into the jaw, and extending therefrom outwardly through a slot 52 in the guide 20 and through the sleeve, the latter being provided with a chamber 54 to receive a head 56 on the screw and to receive a spring 58 resting at one end against the screw head and at its other end against a shoulder 60 at the inner end of the chamber 54. This spring therefore constantly tends to urge the pawls 46 into engagement with the ratchet teeth 44. To prevent accidental rotation of the sleeve 48 about the pintle 50, the sleeve is provided with a tongue 62 which extends into the slot 52 (see Fig. 4), but may be withdrawn therefrom by grasping the sleeve and exerting an outward pull thereon sufficient to overcome the yielding resistance presented by the spring 58 until the tongue 62 is entirely withdrawn from the slot, whereupon the sleeve may be rotated from its operative position shown in Figs. 1 and 2 to a non-operating position shown in Fig. 4, in which the pawls 46 are reversed and simply ride freely along the tops of the ratchet teeth 44. To facilitate first the retraction of the sleeve and then its rotation, the sleeve as shown has a cylindrical portion which is roughed or knurled as at 64. When the pawls are arranged as shown in Fig. 4 the saddle and the jaws may be moved relatively to each other lengthwise of the channel between the jaws, thereby to facilitate preliminary adjustment of the unit to the interposed member within the channel, and after the abutment 30 of the screw 26 or the abutment 32 of the other saddle, as the case may be, has been brought against the object to be clamped, the pawls 46 are reengaged with the ratchet teeth 44 so that, when the actuating screw 26 is rotated in the proper direction, the saddle is moved rearwardly with relation to the jaws and the pawls can travel along the ratchet teeth in one direction. However, when later the thrust of the actuating screw is removed, the pawls cooperating with the ratchets will prevent accidental forward movement of the saddle and will preserve the adjustment so that there need be no readjustment of the unit for successive objects of like dimensions.

Turning now to the second form of the invention illustrated in Figs. 5 to 8 inclusive, the jaws are provided with sets of ratchet teeth 66, and there are cooperating pawls 68 (see Fig. 6) suitably carried by the saddle as by springs 70 conveniently secured to the saddle by screws 72, said springs constantly tending to urge the pawls into engagement with the associated ratchets. The pawls extend through suitable openings 74 provided in the guides 20 of the saddle, and these openings are of sufficient size to permit freedom of movement of the pawls.

To render the pawls ineffective when desired there is associated with each a suitably formed slide 76, herein a "ring" of rectangular formation, which is slidable lengthwise of the spring 70 and which, when retracted to the position shown in Fig. 7, renders the spring ineffective to cause the pawl to engage the ratchet. As a convenience in retracting the pawl, the guide 20 adjacent to the opening 76 is beveled as at 78 to constitute a cam to be engaged by the slide 76, so that when the latter is pushed rearwardly from the position shown in Fig. 6 to the position shown in Fig. 7, the pawl is retracted so that it will not engage the ratchet. After this has been done the saddle and the jaws may be moved freely relatively lengthwise of the channel 14 between the jaws for adjustment of the unit, and after the adjustment has been made the slides 76 are pushed forwardly to permit the pawls 68 to reengage the ratchets 66.

It should perhaps be mentioned in connection with the form just described that in the present invention, as in the aforesaid patent, the rearward movement of the jaws in the saddle is limited by stops 80 in the paths of the arms 34 and secured to the saddle guides 20 as by screws 82.

Having thus described two embodiments of the invention, but without limiting myself thereto, what I claim and desire to secure by Letters Patent is:

1. In a clamp unit, the combination of a pair of wedge-like jaws having opposed clamping faces, a body presenting guides to cause said jaws to approach each other when moved in one direction and to recede from each other when moved in the opposite direction, and means automatically to lock said jaws against movement in the last-mentioned direction while permitting freedom of movement of said jaws in the first-mentioned direction, said means comprising ratchets carried by said body, pawls carried by said jaws, respectively, said pawls being reversibly mounted and each having one position in which it is interengaged with its ratchet and another position in which it is not interengaged with said ratchet, and springs associated with said pawls, respectively, and each adapted to urge its pawl into engagement with its ratchet.

2. In a clamp unit, the combination of a pair of wedge-like jaws having opposed clamping faces, a body presenting guides to cause said jaws to approach each other when moved in one direction and to recede from each other when moved in the opposite direction, said body being provided with slots extending outwardly from said guides, pintles secured to said jaws, respectively, and extending through said slots, pawls reversibly pivoted on said pintles, respectively, and each having one position in which it is interengaged with its ratchet and another position in which it is not interengaged with its ratchet, and springs associated with said pawls, respectively, and each adapted to urge its pawl into engagement with said ratchet.

3. In a clamp unit, the combination of a pair of jaws having opposed clamping faces, a body having opposite side walls between which said jaws are disposed, said jaws and said body being cooperatively formed to cause said jaws to approach each other when said body is moved longitudinally relatively to said jaws in one direction, one of said walls being provided with a slot extending longitudinally of the direction of movement of said body and being provided also with a ratchet extending longitudinally of said slot, a pawl support carried by one of said jaws and extending through said slot, a pawl supported by said support and interengageable with said ratchet to prevent longitudinal movement of said body in a direction opposite to the first-mentioned direction, and means carried by said pawl and receivable in said slot to prevent said pawl from interengaging with said ratchet.

4. In a clamp unit, the combination of a body member having opposite walls between which is a channel, one of said walls being provided with a longitudinal slot from said channel to the outside of such wall, a pair of jaw members received in said channel between said walls, said members being cooperatively formed to cause said jaw members to approach each other when said body member is moved longitudinally relatively to said jaw members in one direction, one of said members being provided with a ratchet extending longitudinally thereof, and means cooperating with said ratchet to lock one of said jaw members against longitudinal movement in the opposite direction, said means including a part extending through said slot from said channel to the outside of such wall and movable lengthwise of and within said slot with such jaw member.

5. In a clamp unit, the combination of a body member having opposite walls between which is a channel, one of said walls being provided with an opening from said channel to the outside of such wall, a pair of jaw members received in said channel between said walls, said body member and said jaw members being cooperatively formed to cause said jaw members to approach each other when said body member is moved longitudinally relatively to said jaw members in one direction, one of said members being provided with a ratchet extending longitudinally thereof, and means cooperating with said ratchet to lock one of said jaw members against longitudinal movement in the opposite direction, said means including a part extending through said opening from said channel to the outside of such wall, and a spring cooperating with said part in causing the locking of such jaw member.

CARL PHILIP STUART.